United States Patent
Strobel

[15] 3,673,902
[45] July 4, 1972

[54] DIE SET; FIXTURE AND METHOD OF MAKING DIES

[72] Inventor: Walter Strobel, 4433 North 68th Street, Milwaukee, Wis. 53218

[22] Filed: Feb. 9, 1970

[21] Appl. No.: 9,537

[52] U.S. Cl.................................83/133, 83/143, 83/619, 83/637, 83/685, 83/699
[51] Int. Cl. ...........................................B26f 1/14
[58] Field of Search....................83/133, 143, 142, 145, 146, 83/619, 637, 698, 699, 685; 29/465

[56] References Cited

UNITED STATES PATENTS

| | | | |
|---|---|---|---|
| 3,554,060 | 1/1971 | Gargrave et al.........................29/465 X |
| 2,364,835 | 12/1944 | Whistler et al.........................83/143 X |
| 3,125,917 | 3/1964 | Smeets...................................83/619 X |
| 195,921 | 10/1877 | Eaton......................................83/133 |
| 3,150,550 | 9/1964 | Berlin et al..............................29/465 X |
| 3,228,262 | 1/1966 | Bennett...................................29/465 X |

Primary Examiner—James M. Meister
Attorney—Donald C. McGaughey

[57] ABSTRACT

A die assembly having lower and upper die shoes mounted on guide pins for reciprocal movement toward and away from each other with the lower and upper die shoes having first and second series of apertures in precise alignment with each other. The assembly further includes a die plate having locating apertures in alignment with both the first and second apertures mounted on the lower shoe; a punch plate having locating apertures in alignment with both the first and second apertures mounted on the upper die shoe; and a stripper plate, having locating apertures in alignment with both the first and second apertures mounted on cross bars which in turn are mounted on the die assembly.

The die and punch are precisely mounted in working alignment on the die plate and punch plate for co-operation with a stripper by the method of placing locating pins in either the first or second apertures and successively placing the die plate, punch plate and stripper on said locator pins for precise machining of the die contour, the punch mounting openings and the punch receiving openings in the stripper.

3 Claims, 5 Drawing Figures

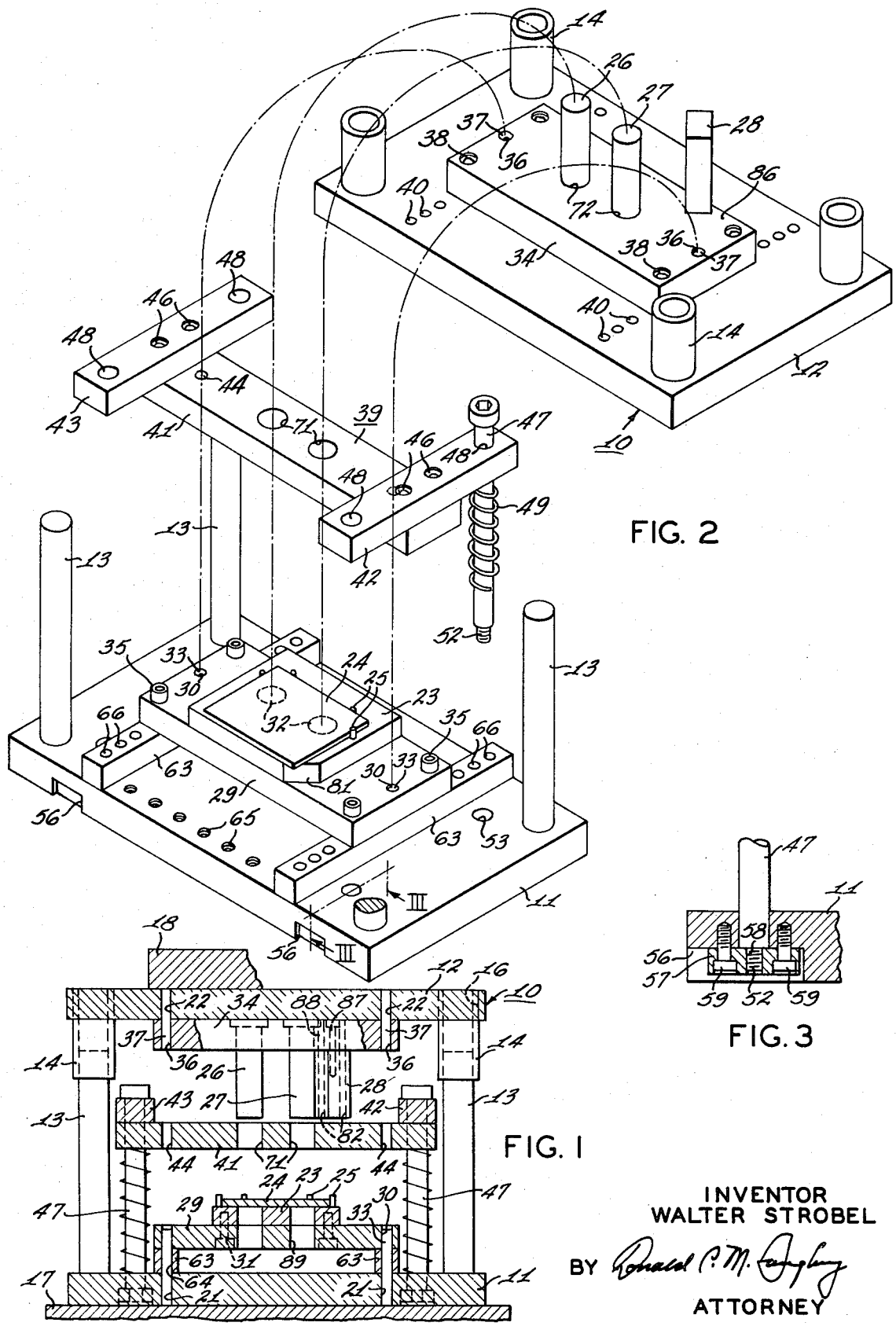

INVENTOR
WALTER STROBEL

BY Donald C. M...

ATTORNEY

DIE SET; FIXTURE AND METHOD OF MAKING DIES

BACKGROUND OF THE INVENTION

1. Field of the Invention

This invention relates generally to punch and die assemblies and to the method of making such assemblies. Further the invention relates to a fixture for producing a highly accurate punch and die assembly at low cost.

2. Description of the Prior Art

Those skilled in the art refer to a completed die assembly as a "die" but for purposes of clarity the completed die will be termed a "die assembly". The phrase "die set" will be used to refer to only the upper and lower die shoes and the associated guide pins which inter-connect the shoes for reciprocal movement. The word "die" will be used to refer to the piece of tool steel in which the punch opening or edge is formed.

Die assemblies, comprising upper and lower die shoes mounting a punch plate and punch, and a die plate and die, respectively are well known in the prior art. To assure sharp well defined production pieces without breaking the dies or shortening the production life of the die it is absolutely necessary that the die be made to conform accurately in all detail to the outline of its associated punch. The fitting of dies to their associated punch element is customarily a long tedious and painstaking task performed by a highly trained and skilled tool and die maker. The expense of such work is very high and in some cases may be so high as to prohibit production of pieces by this method.

To reduce costs and still assure accurate conformity of the punch in the die the prior art suggests that the punch be pressed into a sheet of compressible material placed on top of the die to leave an impression. The tool and die maker then follows the outline of this impression, and drills, reams, routes, saws and files out the desired shape. An example of this method is disclosed in U.S. Pat. No. 2,322,949.

The prior art also suggests that the punch be first manufactured to the desired shape. The punch is then placed between a punch plate and a die both of which are suseptible to recessing by pressure of the punch. Pressure is then applied to the assembly and the tool and die maker then hand works out the desired shape in the die and the punch plate. An example of this method is U.S. Pat. No. 2,816,461.

In both of the above methods a great deal of tedious and expensive hand work is necessary by a highly skilled tool and die maker and if the first die wears out a new die must be carefully made by duplicating the whole process.

A further problem of the prior art is that a die assembly when manufactured can normally only be used for one job after which it is discarded. One of the reasons for discarding the die assembly after one job is that it is customary to bore clearance holes through the lower die shoe of the die assembly to provide a place for the slugs to drop after they are punched out of the work piece and through the die. These slug holes weaken the lower die shoe. As the existing slug holes are usually not correctly positioned for the next job new slug holes would be required and usually such new slug holes would weaken the lower die shoe below acceptable limits. In addition old die assemblies are not used because there is no practical way to quickly and accurately refit new die plates and punch plates into the die assembly.

It is an object of my invention to provide a die assembly of a construction such that it can be accurately assembled at low cost.

Another object of my invention is to provide an improved method of constructing a die, punch and stripper sub-assembly and accurately installing the sub-assembly in the die assembly.

A further object of my invention is to provide a die fixture for use with my method of constructing a die assembly.

SUMMARY OF THE INVENTION

The present invention avoids the shortcomings of the prior art by providing a die assembly in which the lower die shoe has a first series of pre-determined apertures and the upper shoe is provided with a second series of pre-determined apertures in precise alignment with the first series of apertures. The die plate (which may be either the die per se or the die mounted on a support plate), the working tool plate and the stripper, are each provided with locating apertures positioned to align with the first and second series of pre-determined apertures in the lower and upper die shoes.

The die plate, the working tool such as a punch and the stripper can be quickly mounted in the die set with precision following the method of this invention. Either the upper or lower shoe is mounted in a precision boring machine. At least two locator pins are placed in the series of apertures. The die plate, is placed on the lower die shoe with the locator pins projecting into the die plate locating apertures and the desired die shape is bored with the operator recording the precise setting and location of the machine tool relative to the die plate. The die plate is then removed and the working tool support plate is placed upon the same locator pins. The machine tool is repositioned to the previously recorded setting and the punch mounting apertures are bored. This same procedure is repeated for the stripper and assures quick and completely accurate alignment of all necessary openings in the die, punch and stripper.

To facilitate location and assembly of the die on a die support plate and a trimming punch on the working tool support plate a special die fixture is disclosed having access openings in the lower and upper shoes.

DESCRIPTION OF THE DRAWINGS

FIG. 1 is a section view of a die assembly according to the invention.

FIG. 2 is an exploded view of the die assembly shown in FIG. 1 with the upper die shoe orientated 180° from its position as shown in FIG. 1.

FIG. 3 is a partial section taken along line III—III of FIG. 2.

DETAILED DESCRIPTION OF THE INVENTION

Figure 4:
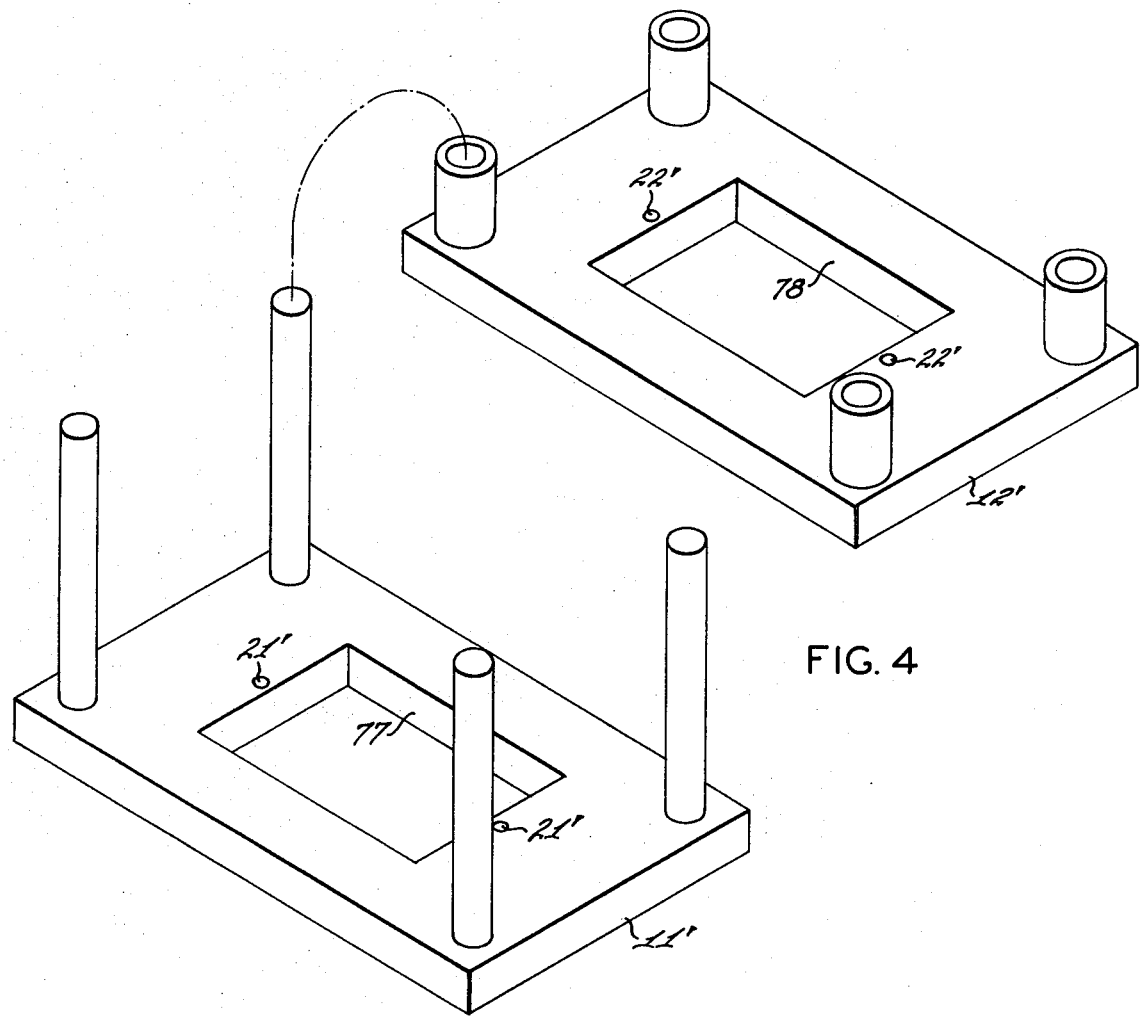
FIG. 4 is an exploded view of a die fixture according to the invention.

Referring to FIGS. 1 and 2 the die set 10 comprises lower and upper shoes 11 and 12. Guide means preferably in the form of four guide pins 13 and bushings 14 inter-connect the upper and lower shoes. If desired as few as two guide pins can be used. Guide pins 13 are rigidly mounted on the lower shoe 11. Guide pin receiving bushings 14 are rigidly mounted in apertures 16 which are bored in upper shoe 12 to precisely align with the guide pins 13. The upper shoe 12 is mountable upon the guide pins 13 which pass through bushings 14 for reciprocal movement toward and away from the lower shoe 11. A first series of predetermined apertures 21, spaced from guide pins 13, are bored in the lower shoe 11 and a second series of predetermined apertures 22, spaced from guide bushings 14, are bored in the upper shoe 12 in precise alignment with the first series of apertures for purposes to be explained hereinafter. Each series of apertures 21, 22 preferably comprise two apertures but more apertures can be used if desired.

The lower shoe 11 is adapted to be mounted, by conventional means, not shown, in the bed of a punch press 17. The upper die shoe 12 is similarly adapted to be connected by conventional means, not shown, to the reciprocal power ram 18 of the punch press 17. The downward stroke of the press ram 18 will move the upper die shoe 12 toward the lower shoe 11 and the upward stroke will move the die shoe 12 away from the lower shoe 11.

The actual stamping of a work piece 24 is performed by a suitable die 23 and punches 26, 27, 28 mounted on the lower and upper shoes 11 and 12 respectively. The position of work piece 24 for stamping is determined by pins 25. The addition of components 23, 26, 27, 28 and a stripper 39 complete the die set into the "die assembly." For purposes of illustration two perforating punches 26, 27 and one trimming punch 28 are shown. The die 23 is usually mounted upon the shoe 11 through the provision of a die plate 29, although if the die is of a size and thickness to afford sufficient strength, the die plate 29 can be omitted. In actual operation the plate 29 supports the die 23 and thus will be termed a die support plate. The die support plate 29, or the die 23 if no die support plate 29 is used, is provided with a plurality of first locating apertures comprising at least two locating apertures 30, positioned and located to align with both the first series of apertures 21 in the lower shoe 11 and the second series of apertures 22 in the upper shoe 12. If a die support plate 29 is used the die 23 is mounted on the plate 29 in conventional manner using machine screws 31 and dowel pins (not shown) in drilled and reamed openings. It is not necessary to precisely locate the blank die 23 on die support plate 29 as locating the position of the die contour 32 is part of my novel method as will be more fully explained hereinafter.

The die support plate 29 may be detachably mounted directly on the lower die shoe 11 by means of first locator pins 33 and machine screws (not shown). It is preferably that the die support plate 29 be mounted on at least a pair of risers 63. Each riser 63 comprises a bar, rectangular in cross section, provided with a fourth locator aperture comprising locator aperture 64 of the same diameter as locator apertures 30. In addition each riser has a series of tapped apertures 66. The die support plate 29 is fastened to the risers 63 by machine screws 35 which pass through the die support plate 29 into tapped apertures 66. The shape of the risers 63 is not critical. Each riser need only have one locator aperture 64 to receive locator pin 33. The risers 63 can be affixed between the lower shoe 11 and the die support plate 29 in any conventional manner as for example by the use of machine screws. The use of risers 63 obviates the need for drilling slug holes in the lower shoe 11. Thus the lower shoe is not weakened and can be reused. If necessary additional intermediate risers can be placed between the two end risers 63 shown in FIG. 2 and secured by machine screws threaded into apertures 65. The use of intermediate risers will give additional support to the die support plate 29.

An additional component of the die assembly is a working tool plate 34 hereinafter called a punch plate. The punch plate 34 is provided with a plurality of second locating apertures comprising locating apertures 36 positioned to align with both the second series of apertures 22 and the first series of apertures 21. Perforating punches 26, 27 and trimming punch 28 are mounted on punch plate 34 in conventional manner. However, the locating of the mounting position for punches 26, 27, and 28 is part of my novel method which will be more fully explained hereinafter. The punch plate is detachably mounted on the upper shoe 12 by means of second locator pins 37 and machine screws 38 which are threaded into apertures 40.

A further component of the die assembly is a stripping means in the form of bridge stripper assembly 39. Other forms of strippers can be used if desired. With the upward or return stroke of the press ram 18 the stripper 39 causes the work piece 24, after it has been punched, to be stripped from the punches 26, 27. The stripper assembly 39 comprises a stripper plate 41; a pair of stripper cross bars 42, 43 fastened to the outer ends of stripper plate 41 by machine screws 46; four stripper bolts 47 (only one of which is shown in FIG. 2) are slidably received in openings 48; and stripper return compression springs 49 are mounted in surrounding relation to each of the stripper bolts 47. Referring to FIGS. 2 and 3 the stripper bolts 47 each have a threaded end 52 which is fastened into the lower shoe 11 in a manner which will now be explained. The stripper bolts 47 must be mounted in an exact right angle relationship to the plane defined by lower shoe 11 to prevent any binding of cross bars 42, 43 as they reciprocate on bolts 47. To achieve this right angle relationship the holes 53 are precision bored in the lower shoe 11. A portion 56 of the lower shoe 11 is milled away. An insert 57 having a drilled and tapped opening 58 is then placed in portion 56 and the end 52 of stripper bolt 47 is threaded into opening 58. The insert 57, held in place by stripper bolt 47, is then drilled and the lower shoe 11 tapped to receive mounting machine screws 59. The stripper plate 41 is provided with a plurality of third locating apertures comprising locating apertures 44 positioned to align with the first and second series of apertures 21, 22.

From the foregoing it will be appreciated that the die assembly 10 includes the lower and upper shoes, 11, 12, the die support plate 29, the punch plate 34 and the stripper assembly 39. These basic elements are adapted for mass production wherein the first and second series of apertures 21, 22 and the locator apertures 30, 36, 44 are bored in precise vertical alignment. This die assembly can be furnished as a standard catalog assembly to the manufacturer of stampings who designs and installs punches 26, 27, 28 of such size and at such locations in the die set as are needed. The manufacture of stampings will follow my method of locating the punch in relation to the die in the complete die assembly as will be explained.

Figure 5:
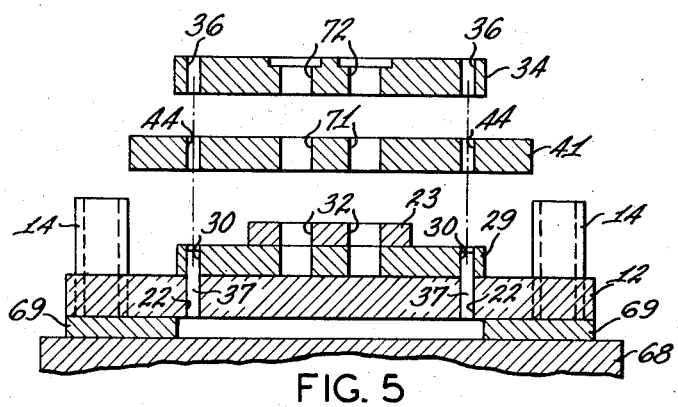
FIG. 5 is an elevational view of the upper shoe of the die fixture shown in FIG. 4 with a die support plate positioned thereon ready for boring and illustrating the working tool plate and the stripper which to be sequentially p positioned on the fixture for boring.

Refer now to FIG. 5 which illustrates the components of the die that will be sequentially positioned on a die shoe for precision machining. Either the lower or upper shoe 11, 12 but preferably the upper shoe 12, can be mounted in a precision metal, working machine such as a standard boring machine 68 wherein the work position of the spindle or worktable can be accurately read and recorded to permit the operator to subsequently re-position the spindle or work table to a previously selected work position. At least two locator pins 37 are placed in the series of apertures 22 in shoe 12. Preferably the shoe 12 will be mounted in the boring machine 68 upon spacing blocks 69, to provide a space into which locator pins 37 may be driven when it is desired to remove them.

The die support plate 29 with die 23 thereon is then placed upon the shoe 12 with locator pins 37 projecting into the locating apertures 30 in the die support plate. Die holes 32 are bored in the die 23 with the operator recording the precise positions of the boring machine 68 for each die hole. The die plate 29 is then removed and the stripper plate 41 is mounted with the locator pins 37 entering into the locating apertures 44 of the stripper plate. The boring machine is re-positioned to the precise position as previously recorded for machining the die holes 32 and the stripper holes 71 are bored with suitable tolerances. The stripper plate 41 is then removed and the punch plate 34 is placed upon the die shoe 12 with the locator pins 37 entering into the locating apertures 36. The boring machine is re-positioned to the previously recorded position and the punch mounting holes 72 are bored and countersunk.

It will be appreciated that a boring machine is only referred to for purposes of illustration. If desired a tape controlled milling machine could be used with co-ordinate locations on tape to machine the necessary holes 32, 71, 72 in the die assembly components.

While it is possible to use either the lower or upper shoe as a fixture for accurately machining holes 32, 71, 72 I have designed the special fixture 76 shown in FIG. 4 to facilitate assembly of the punch and die assembly. The fixture 76 comprises lower and upper fixture shoes 11', 12', which correspond in size to my standard die set shoes 11 and 12. The fixture differs in that the lower and upper shoes 11' and 12' are each provided with access openings 77 and 78. Locating apertures 21' and 22' respectively are provided in each shoe 11' and 12'. The locating apertures 21', 22' correspond exactly to apertures 21, 22 in lower and upper shoes 11, 12 and align exactly with the locating apertures 30, 44, 36 in the die support plate, stripper plate and punch plate respectively.

The primary purpose of access openings 77 and 78 is to facilitate the locating and installation of trimming punches such as punch 28 shown in FIG. 2. Trimming punches such as punch 28 must be mounted by means of dowels and machine screws to prevent any shifting of their position during operation. The die support plate 29 with die 23 thereon is assembled on the lower fixture 11'. It is understood that the trimming edge 81 of die 23 (FIG. 2) has been previously machined. Also at least two dowel holes 82 and a tapped mounting hole 83 shown in FIG. 1 have been provided in punch 28. The punch 28 is set in place along side of edge 81 and held in position by any suitable means such as a rubber band passed around the contour of the die 23. A shim may be placed between punch 28 and edge 81 to provide the proper operating clearance. A spotting screw, which is well known in the art, is threaded into the tapped mounting hole 83 and the upper fixture 12', with punch plate 34 mounted thereon, is placed upon fixture 11'. The lower and upper fixtures are brought together so that the spotting screw makes a center punch mark on the surface 86 (FIG. 2) of punch plate 34. The upper fixture 12' is then removed and a machine screw receiving hole is drilled at the location of the center punch mark. The upper fixture 12' is then re-positioned upon the lower fixture 11'. Because of the access opening 78 it is possible to now install a machine screw 87 (FIG. 1) directly into the punch 28. A machine screw or screws such as screw 87 will not accurately maintain the position of punch 28. Thus after machine screw 28 is installed the upper fixture 12' is removed with the punch 28 affixed to the punch plate 34. As the punch 28 is hardened tool steel it is now possible, using dowel holes 82 in punch 28 as a guide, to drill and ream dowel pin holes into punch plate 34 which align exactly with dowel pins 82 in punch 28. Dowel pins 88 (FIG. 1) are then installed. It will be understood that without access opening 78 the fixture 12' would have to be removed to provide access to install screw 87. Such removal is impossible as removal will disturb the critical positioning of punch 28 on the punch support plate 34.

The prior art method would be to drill right through the upper shoe 12 to install both dowels 88 and machine screw 87. These holes are frequently in such a position as to interfere with the mounting of composents when subsequent re-use of the die set is desired. In addition the holes tend to weaken the upper shoe 12. The use of my special fixture permits the mounting of the trimming punch without the necessity of drilling any opening in the upper shoe 12.

When using a die set as herein described it is never necessary to discard the upper and lower die shoes 11 and 12 as the use of the risers 63 obviates the need for slug holes in the lower shoe 11. Slug holes 89 are provided only in the die support plate 29 (FIG. 1). Thus the only components that would be discarded are the die support plate 29, the stripper plate 41 and the punch plate 34. All of these plates can be manufactured by the die set manufacturer as standard "off the shelf" blank plates with locating apertures 30, 44, 36 precisely located and bored to align with the first and second series of apertures 21, 22 in the standardized lower and upper shoes.

The above described punch and die assembly and method of aligning the punch, stripper and die elements is low in cost relative to conventional dies while permitting the user to accurately duplicate the components and re-use the lower and upper die shoes of a die set.

While there have been shown and described particular embodiments of the invention, it will be obvious to those skilled in the art that various changes and modifications may be made therein without departing from the invention and, therefore, it is aimed to cover all such changes and modifications as fall within the true spirit and scope of the invention.

The embodiments of the invention in which an exclusive property or privilege is claimed are defined as follows:

1. A die assembly in which a die and a working tool are mounted for working engagement with sheet material to be stamped comprising;
   A. lower and upper die shoes,
   B. guide means mounted on and inter-connecting said upper and lower shoes in precise alignment for reciprocal movement toward and away from each other,
   C. a first series of predetermined apertures in said lower shoe spaced from said guide means,
   D. a second series of predetermined apertures in said upper shoe spaced from said guide means in precise alignment with said first series of apertures,
   E. a die plate having a plurality of first locating apertures,
   F. means detachably mounting said die plate on said lower die shoe,
   G. a working tool support plate having a plurality of second locating apertures,
   H. means detachably mounting said working tool support plate on said upper die shoe,
   I. stripping means having a plurality of third locating apertures,
   J. means detachably mounting said stripping means on said lower and upper die shoes,
   K. said first, second and third pluralities of locating apertures and said first and second series of predetermined apertures all being located in precise vertical alignment,
   L. first locator pins mounted in each of said first series of predetermined apertures and first locating apertures for aligning said die plate on said lower die shoe, and
   M. second locator pins mounted in each of said second series of predetermined apertures and said second locating apertures for aligning said working tool support plate on said upper die shoe.

2. A die assembly according to claim 1 wherein riser bars are detachably mounted on said lower die shoe having fourth locating apertures, with locator pins passing through said first series of apertures and said fourth locating apertures in said risers and said first locating apertures in said die plate.

3. A die assembly according to Claim 1 wherein said stripper comprises a plate having locator apertures therein, said plate being mounted on a pair of spaced cross bars which in turn are mounted on either said upper or lower shoe.

* * * * *